United States Patent

Kärem et al.

[11] Patent Number: 6,099,679
[45] Date of Patent: Aug. 8, 2000

[54] METHOD FOR GLUING, DEVICE FOR CARRYING OUT THE METHOD AND GLUE COMPOSITION FOR USE IN THE METHOD

[75] Inventors: Jaan Kärem, Vimmerby; Heléne Bolm, Västervik, both of Sweden

[73] Assignee: DuPont Powder Coatings Scandinavia AB, Sweden

[21] Appl. No.: 09/091,094

[22] PCT Filed: Dec. 12, 1996

[86] PCT No.: PCT/SE96/01642

§ 371 Date: Dec. 15, 1998

§ 102(e) Date: Dec. 15, 1998

[87] PCT Pub. No.: WO97/21777

PCT Pub. Date: Jun. 19, 1997

[30] Foreign Application Priority Data

Dec. 13, 1995 [SE] Sweden ................................. 9504460

[51] Int. Cl.[7] .......................... B32B 31/12; C09J 167/00
[52] U.S. Cl. .................................... 156/273.1; 156/273.3; 156/275.7; 156/283; 156/320; 156/332; 156/379.6; 156/380.9; 156/497; 156/499; 522/6; 522/104
[58] Field of Search ........................... 156/273.1, 273.3, 156/275.5, 275.7, 283, 320, 321, 322, 330, 332, 350, 379.6, 380.9, 497, 499, 580; 522/6, 100, 101, 104, 105

[56] References Cited

U.S. PATENT DOCUMENTS 3,928,346 12/1975 Wentworth .............................. 525/443
4,163,810 8/1979 McGinniss ............................... 427/514
4,356,050 10/1982 Crivello et al. ....................... 156/273.3
5,089,076 2/1992 Leach et al. ............................. 156/283
5,281,481 1/1994 Hayward .
5,877,231 3/1999 Biller et al. ................................ 522/93

FOREIGN PATENT DOCUMENTS 0 490 136 A2 6/1992 European Pat. Off. .
39 38 376 A1 5/1991 Germany .

Primary Examiner—Michael W. Ball
Assistant Examiner—Michael A. Tolin
Attorney, Agent, or Firm—Lerner, David, Littenberg, Krumholz & Mentlik, LLP

[57] ABSTRACT

Methods for gluing a pair of surfaces are disclosed including preparing a glue from a polymer in the form of a powder, the glue having a melting temperature of up to about 100° C. and being curable by electromagnetic radiation, applying the powder in a dry state to at least one of the two surfaces, heating a region proximate to at least one of the surfaces whereby the powder melts but does not cure, subjecting that surface to electromagnetic radiation to initiate curing of the powder, and joining the two surfaces together prior to completion of curing whereby the two surfaces adhere to each other by means of the tackiness of the glue and are maintained together by the subsequently cured glue. Apparatus for gluing the two surfaces together are also discussed, as are glue compositions for use therein.

15 Claims, 2 Drawing Sheets

METHOD FOR GLUING, DEVICE FOR CARRYING OUT THE METHOD AND GLUE COMPOSITION FOR USE IN THE METHOD

TECHNICAL FIELD

The present invention relates to a method for gluing and a device and a glue composition intended to be used for the gluing according to the method.

STATE OF THE ART

The agglutination of surfaces requires a substance, the glue, which may be brought to a first, tacky state, so that the glue adheres to the surfaces which are to be joined. When the surfaces have been united with the glue between them, the glue is converted to a more or less solid state, whereby the glue joint obtains its final tenacity towards rupture of the joint. The difference in cohesive force between the first and the second state may be extremely different.

Certain glues, such as urea-formaldehyde resin glues, have a very low cohesive force in the first state but provide a strong joint when the glue has hardened. Other glues, such as contact adhesives, provide a joint of a considerable strength immediately after the surfaces have been joined, but thereafter the strength of the joint does not increase very much.

The conversion from the first to the second state may, depending on the type of glue, occur in many different ways. In the first state, many glues are a tacky mass, which solidifies by means of the evaporation of a solvent. Such solvents are often non-environmentally friendly; volatile hydrocarbons are common. Other glues are hard at room temperature and are converted to a tacky state by heating. However, the utilization of a phase change in this way will normally give limited strength to the finished glue joint. In many cases, furthermore, it is not rational to work with a glue which has to be kept heated during the gluing operation. There are additional glue types and systems, which start from natural products or from more conventional chemical products or systems.

Another branch of glue technology is represented by polymeric materials. Thermoplastic systems, which are brought to a tacky state by heating and to a solid state by cooling down, do not in principle differ particularly from conventional systems with a corresponding process course. Systems with thermosetting plastics, on the other hand, represent a special branch of glue technology. Such plastics may be given a plurality of states, from thinly fluid, through viscous tacky masses, to a solid state as foils, which are converted to a tacky state by heating during the gluing process itself. After the gluing surfaces have been brought together, the glue is, by means of curing of the plastic, converted to a solid state from the first state with a more or less fluid consistency. This requires initiation of the curing, which may occur in different ways depending on the type of thermosetting plastic and its components. An addition of a chemical hardener is often used which, however, has the disadvantage that the gluing process has to be performed within a limited time and that difficulties arise when it comes to cleaning the utilised vessels and tools if the plastic is allowed to cure on these.

Thus, there are both disadvantages and limitations with the use of thermosetting adhesives since, in many cases, they may be less rational to use in industrial production than other gluing systems. In many respects, however, they possess superior properties when it comes to the strength of the glue joint, long lifetime towards ageing and small influence on the strength when heated within the temperature range during use. A further advantage is that the curing does not give any emission of environmentally harmful substances, which is the case when glues with solvents are concerned.

SUMMARY OF THE INVENTION

The present invention has as an object to provide a gluing method, which starts from a thermosetting resin glue, which is also comprised by the invention. The object is to achieve a method which is very rational to carry out in industrial production, whereby the glue in question is very convenient to handle. At the same time the earlier mentioned advantages, which are associated with thermosetting adhesives, are gained, namely high strength and heat resistance of the glue joint and the absence of emissions of substances which are dangerous to the environment during the gluing.

This is achieved since the glue is manufactured in a pulverous state and may be in this state right up to the start of the gluing process. The entire handling, including the application of the pulverulent glue, may consequently be done with a dry product and, as such, no storage vessels or tools for the handling and application of a tacky mass are required, so that a very rational method thereby is obtained.

DESCRIPTION OF THE DRAWINGS

The method and the glue according to the invention are described in the following. Thereby, reference is made to two specific gluing processes which are illustrated in attached drawings by schematic representations of each process equipment, as is shown in FIGS. 1 and 2, respectively.

PREFERRED EMBODIMENT

Figure 1:
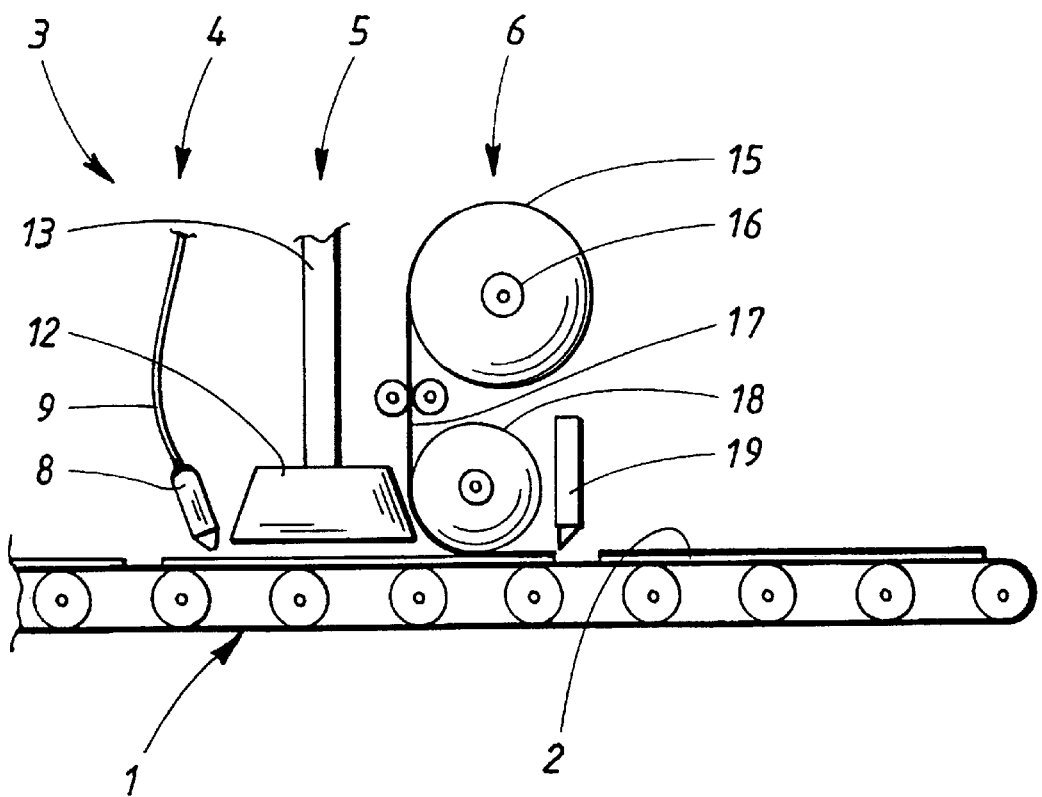

The description of methods according to the invention will start with an account of a gluing process performed in process equipment which is schematically shown in FIG. 1. In this case, the process relates to the gluing of a film to steel plates. The resulting product is panels intended to be used as a wall covering. One extensive field of use is as a wall covering in ships, train carriages etc., and also in buildings, especially in prefabricated ones. In the drawing, reference numeral 1 denotes a conveyor belt on which steel plates 2, in a consecutive order, may be conveyed forwards, from left to right in the drawing. The plates thereby pass a laminating mill 3. This comprises, seen in the direction of transport, a glue application station 4, a heating station 5 and a laminating station 6.

The application station 4 for the pulverulent glue is herein shown to consist of one or several powder spray guns 8, arranged for electrostatic charging of the powder. In order to cover the full width of the plates 2, one or several of the guns may be arranged for movement back and forth in the transverse direction of the plates. Hereby, it is assumed that the plates are electrically conductive, they may for instance be made of steel or aluminium, and earthed, which is achieved by the plates lying on the conveyor belt 1 which in turn is connected to earth. The guns 8 are supplied with powder and pressurized air for the spraying via one or several conduits 9.

The heating station 5 is hereby shown as a hood 12 over the conveyor belt. It is arranged for convection heating by means of the supply of heated air through a conduit 13.

The laminating station 6 is supplied with the film which is to be glued to the plates from a roll 15 which is rotatably suspended on a shaft 16. A film web 17 runs from the roll to the nip between the plate 2, which is to be laminated, and a press roller 18. After the press roller there follows a film cutting member 19.

The laminating plant is very schematically shown and described as one embodiment amongst many alternative embodiments. Thus, the plant may be arranged for continuous lamination of a long plate web, which is fed from a roll and which is cut into suitable lengths for use after the lamination. The pulverulent glue may be applied in another way than by spraying even if this is an advantageous method. The heating may, besides by hot air, be done by infra-red heat or contact heating of the plates. Also heating by means of induction is a possible alternative.

In the shown embodiment, the plates 2 are gradually advanced on the conveyor belt 1 and firstly meet the glue application station 4 at which the surface of the plate is sprayed with the electrically charged glue powder. A layer of this sticks to the surface of the plate which is earthed, and is retained thereon by electrostatic forces. In the heating station 5 the plate is exposed to the hot air, which should hit the plate at a low speed in order not to blow the powder away. By means of the heating, the plate should reach a temperature of 250 ° C. before it reaches the spot where the film web 17 is pressed into contact with the plate by the press roller 18. When the plate has passed the press roller, the film web is cut at 19, which may be done by means of cutting/shearing or by means of heat which melts the film along a line. At the same time, a new plate is brought in beneath the roller 18 and the operation is repeated.

The earlier mentioned temperature is so adapted that the glue powder is melted so that it sticks to the two united surfaces. Immediately thereafter, the powder, which as earlier mentioned consists of a thermosetting plastic, is cured. A temperature of 250° C. has proved to be applicable for the composition which will be described in the following. At the same time, the temperature allows lamination without the film being damaged. Here, it is namely assumed that the film is a plastic film with a melting temperature which is just above said value. When material compositions other than a plastic film are concerned, such as PVC laminated on a metal plate, it may be necessary to choose a lower temperature in order not to damage the materials. In such cases, the powder composition must also be adapted to melting and curing at such a lower temperature.

Certain method steps, which represent the principles of the method, are evident from the described embodiment. These steps are:

1. Preparing a glue composition which completely, or to a considerable extent, consists of an uncured, thermosetting plastic, which in this state and in a temperature range around about room temperature, adopts a solid state, while at a raised temperature, for instance 80–300° C., by means of melting it forms a tacky mass with adherence to surfaces which are to be glued.

2. Preparing the glue composition for use, to a dry powder with the composition so adapted that the powder can be given an electrostatic charge.

3. Preparing the gluing surfaces in order to provide for the adhesion of the glue to these. The surfaces should of course not be dusty, dirty or greasy, something which in general is valid for all gluing. In certain cases, it may also be necessary to remove traces of oxide, rust or embers from the surfaces. Despite such basic pre-treatment, it may be advantageous for the strength of the glue joint if the surfaces are pre-treated. When steel plate is the substrate, chromating has been shown to be of value. In other cases, the application of a primer may be convenient. This may contain an organic component in order to obtain a good affinity to the thermosetting plastic in the glue. For environmental reasons, solvent-based coatings should be avoided, whereby water-based compositions may be an alternative. Another alternative may be that the primer coating is also done by powder coating.

4. The powder glue is given an electrostatic charge. The purpose is partly to give the powder particles a uniform distribution in the room during the application process so that the powder particles coat the gluing surface with an even layer, and partly in order to get the powder particles to adhere to the glue surface until such heating has occurred that the powder sticks to the gluing surface. The last mentioned effect, that the powder particles should be retained on the gluing surface by electrostatic forces, presupposes that a difference in potential may be maintained between the charged powder and the gluing surface. As mentioned earlier, this may occur if the substrate is electrically conductive and earthed during the application. When non-conductive objects, such as chipboard as a substrate, are concerned it may be necessary to resort to methods other than the one mentioned, for instance coating the surface of the substrate with a conductive varnish, moistening of the surface of the substrate or pre-heating to such a temperature that the powder particles adhere by melting in the interface towards the substrate.

5. Applying the glue powder on at least one of the surfaces which are to be agglutinated. Application by means of spraying from guns which give an electrostatic charge before the spraying with pressurized air, is a well-tried and advantageous method.

6. Heating to such a temperature that the powder melts in order to stick to the gluing surfaces. As mentioned in the example, the heating may occur by means of the object, in this case the plate, being heated to the required temperature so that the melting temperature of the powder may be reached and maintained in connection with the application of the non-heated film. In other cases it may be convenient to heat both components which are to be joined. When objects having a larger mass are concerned, such as boards of a larger thickness, through-heating does not have to be practised but only surface-heating. Thus, heating by means of infra-red radiation may be a suitable method, possibly in combination with hot-air heating. Objects which conveniently should be through-heated may be heated before the gluing, for instance in an oven.

7. Joining the gluing surfaces while maintaining such a temperature that a curing of the powder takes place in direct connection to the joining. The means for obtaining a strong glue joint is a joining with a raised surface pressure, and of course while ensuring that no air cushion is formed between the surfaces. A lengthy pressing together of the surfaces is, however, not required. If the appropriate parameters for the gluing method have been chosen, a very rapid curing of the thermosetting plastic in the powder is obtained.

After this description of the method, both in a specific embodiment as well as in its general form, a description of a preferred glue composition now follows.

The main components of the glue should be one or several polymers or co-polymers of a thermosetting type, systems for initiation of the thermosetting and whenever applicable fillers, particularly applicable when uneven surfaces, which do not come into complete contact with each other, are concerned, pigments for colour adjustment, especially at joints where the glue partly becomes openly visible or perceptible by means of a certain transparency of the substrate, and additives for increasing the strength of the glue joint and/or in order to facilitate the gluing process. Below, components which are useful in this context are listed.

Examples of Components

Thermosetting plastics:

Polyester (hydroxy-functional polyester)
Polyester (acid-functional polyester)
Acrylic (hydroxy-functional polyester)
Acrylic (acid-functional acrylate)
Acrylic (epoxy-functional acrylate)
Epoxy (Bisphenol-A type)
Epoxy (Novolac-type)
Hardeners:

Blocked IPDI derivative
IPDI-uretidione
TDI derivatives
TMXDI and other polyisocyanates
Triglycidylisocyanurate
Melamines
Glycouriles
Hydroxy-alkylamides
Glycidylbased compounds
Derivatives of dicyandiamide
Modified aromatic and aliphatic polyamines
Polyphenoles
Acid anhydrides
Amino resins (melamine, benzoguanamine, glycoluryl)
Other additives:
Additives:

Accelerators, Benzoin, Flow additives, Wetting agents, Flatting agents, Waxes, Adhesion promotors
Fillers:

Inorganic compounds such as $BaSO_4$, $CaCo_3$, $CaSiO_3$, Dolomite, Talc, Mica
Pigments:

Inorganic, organic, $TiO_2$

When composing a specific glue, the components suitable for the prevailing conditions are selected from the conceivable components in each group. Accordingly, determining factors are the adhesion between the gluing surfaces in question and the glue, the physical shape of the surfaces, the possibility of a tight or less tight fit-up, smoothness etc., possible absorption of the substrates such as when fibrous materials are concerned, permissible melting and curing temperature, possible limits are 80° and 300° C., desired curing time whereby possible times lies within the range 5 seconds to 5 hours, and requirements concerning the agglutinated objects, such as strength of the joint, resistance to fatigue, flexibility from hard as glass to elastomer-like and resistance to both low and high temperatures.

As is evident, one or several thermosetting plastics are selected for the binder system, from one or several of the groups polyester, acrylic or epoxy with a thermo-initiating hardener adapted for curing at a predetermined temperature and curing time. Depending on the circumstances, important additives are accelerators when a shortened curing time is desired, flow additives in order to obtain a suitable viscosity when pressing together the gluing surfaces, thus additives which are dependent on the process requirements, and wetting agents and adhesion promotors in order to achieve increased adhesion which is particularly important for voidless, shiny materials which are difficult to wet, for instance glass. Pigments as well as flatting agents are as earlier mentioned, in the main, based on appearance requirements. The fillers are not chemically active in this context, but are important where a filling of cavities in the joint is necessary.

The strength of a glue joint depends on the tenacity of the glue and its adhesion to the gluing surfaces. When a thermosetting plastic is concerned, the adhesion is normally the most critical. In the present context, the co-polymer Methylvinylester—Maleic anhydride has been found to be an effective adhesion promotor, particularly when polyester as a binder system is concerned.

Specific for the described and disclosed method is that the pieces which are to be joined may be heated to the temperature which is required for the curing of a thermosetting adhesive, normally about 200° C. This may be realized without difficulties in the process which has been mentioned, namely laminating, where both parts are in the form of thin layers, which can easily be through-heated by the supply of heat from outside. Since at least one of the layers is pliable, heat can easily be supplied in the gap which is formed between the two surfaces, if the pliable layer is successively, conveniently by rolling, applied onto the piece which is to be laminated. Such lamination does not have to imply that two elongate webs or at least one elongate web is necessary, as in the described process, and provides the possibility of a continuous process. It is also possible with individual pieces of laminating layers and carrier layers if the laminating layer is kept bent upwards and is successively pressed down against the carrier layer.

There are, however, work pieces and conditions in which the described process cannot be practised. This is especially valid for stiff pieces such as hard plates, which cannot be joined successively while being bent up, and pieces which are difficult to heat to the curing temperature of a thermosetting adhesive. The latter limitation may be due to the fact that the material of one or both the pieces does not allow a heating to the curing temperature since they may melt or be deformed, or because the mass is so large, when thick pieces are concerned, that a through-heating would be far too energy-consuming. Therefore, an alternative method will be described herein, which enables gluing with a pulverous thermosetting plastic also during said conditions. Thus, reference is made to FIG. 2. The method is based on preparing the glue to have a low melting temperature, which is adapted to the temperature endurance of the work pieces. By means of a suitable composition of the glue, a melting point below 100° C. may be reached. This temperature is sufficient only in order to get the glue into a melted and sticky state, but not in order to cause it to cure. Instead, the glue is composed with a curing system which gives curing by means of electromagnetic radiation, preferably ultraviolet radiation (UV-radiation). Also, other electromagnetic radiation such as gamma radiation may initiate curing if the curing system of the glue is designed therefor.

Curing by radiation occurs in a very short time, times down to one or a few seconds may be reached, which is considerably faster than when thermosetting is concerned. Since such radiation cannot reach into the glue joint, when non-transparent work pieces which have been joined are concerned, the irradiation must take place while the work pieces are separated. Consequently, the curing time of the glue must be adapted so that the work pieces can be joined before curing begins. These requirements may be met by means of a method according to the following specification:

1. Preparation of the glue composition from an uncured thermosetting plastic so that it, at a moderately raised temperature assumed to be below 100° C., by melting from a solid state forms a tacky mass with adhesion to the surfaces which are to be glued. The glue composition is arranged not to cure at said temperature but to cure when exposed to electromagnetic radiation such as UV-radiation.

2. Preparation of the glue composition as a dry powder which may be given an electrostatic charge.

3. Preparation of the gluing surfaces in order to provide for the adhesion of the glue thereto.

4. Heating of at least the surface layer of at least one of the objects which are to be agglutinated to such a temperature that, when powder is applied, it reaches said temperature level where melting to a tacky state occurs. Since the applied powder might not completely adopt the temperature of the surface, and since a certain cooling may take place, it may be presumed that the surface temperature must be a little higher than the temperature at which the powder melts, but not so high that thermal curing of th e plastic arises.

5. Application of the glue powder on the surface or at least on one of the heated surfaces. Thereby, the powder is preferably provided with an electrostatic charge for distribution of the powder. If the surfaces have another potential or polarity in relation to the powder, the distribution of the powder may at the same time, to a great extent, be limited to such surfaces.

6. Exposing the applied and, by means of heat conduction from the coated surface, melted powder to electromagnetic radiation so that curing is initiated. The powder must, however, be adapted so that curing does not begin at once and before the next moment has been performed.

7. Joining the gluing surfaces under compression before curing takes place (see above).

The powder which is to be used is primarily of the same type which has been described for the thermo-setting method. However, the powder must be adapted for radiation-curing by containing curing initiators or such a polymer system, which in itself is initiated by the chosen radiation. Particularly for curing with UV-radiation and with a powder which melts at said low temperature, the following composition may be adopted:

The main component of the powder is to 50–<100% an unsaturated polyester, amorphous or crystalline. Furthermore, a hardener is preferably included in order to obtain increased cross-linking during the curing stage. This hardener may be an aromatic urethane diacrylate oligomer, a triacrylate of trihydroxy-ethylisocyanurate, a vinyl ester, an oligomer acrylourethane or something similar, to 15–50%. An addition of a photoinitiator is required in order to initiate the curing stage. This addition may vary between 1–3%. For a clear varnish, it is advantageous to use a 1-hydroxy-cyclohexyl-ketone as a photo-initiator, and for white pigmented systems 2,4,6-trimethylbensoyl-diphenyl-phosphineoxide may be used. This is however only specified as an example and completely different photo-initiators may be needed for particular purposes. An addition of a levelling agent is also presumed. 1–3% of this is recommended. As a levelling agent e.g. acrylates may be used.

Basic recipe for a composition which provides good levelling-out after melting at low temperatures and a good solvent resistance.

Unsaturated polyester 70–85%

Hardener 15–30%

Photo-initiator 1–3%

Levelling agent 1–3%

The melting temperature of the powder should, at the most, be 80–90° C. in order to ensure that a wooden component is not damaged during the melting phase. The melting should take place by means of IR-heat or a combination of IR- and convection heat. This implies that the melting phase, at such relatively high temperatures as these, does not have to be in progress during an especially long time since IR rapidly heats the wooden components to the desired temperature. A few minutes may be assumed to be what it is needed, but is very much dependent on the material which is to be coated. Certain wooden materials are very sensitive to a rapid heating and experience a strong degassing, which might entail that a slower and more careful heating method must be selected.

Figure 2:
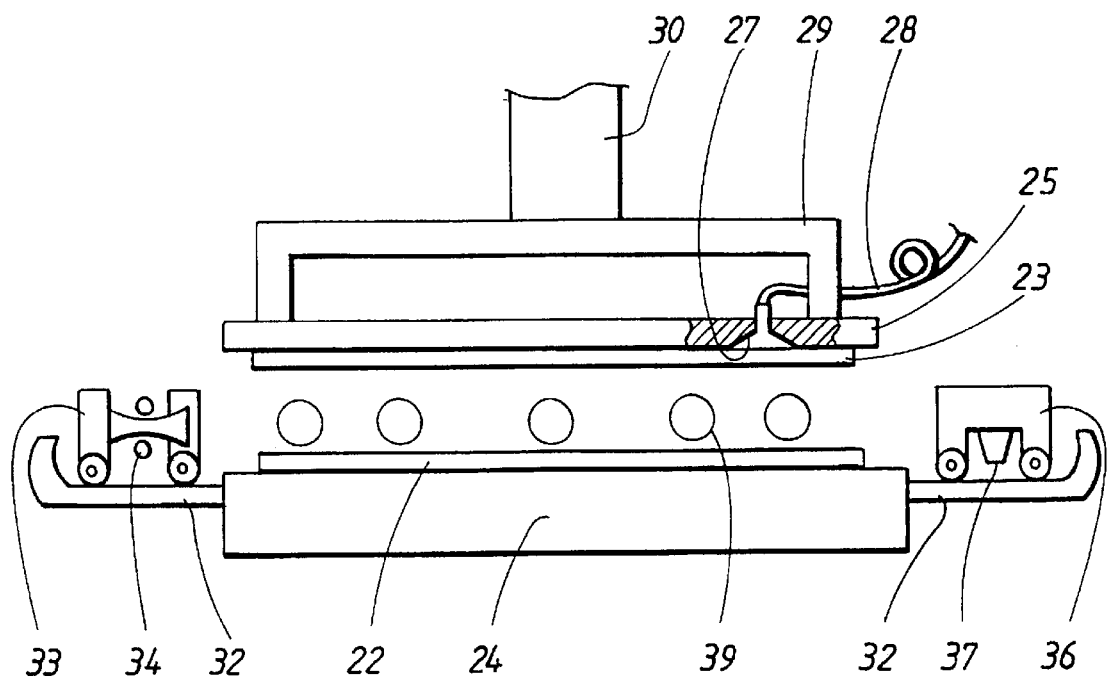

By way of example, a device for carrying out the described method is shown in FIG. 2. Here it is assumed that two stiff slabs 22 and 23 are to be agglutinated. The slab 22 is placed at the bottom and on a fixed table 24. The slab 23 is supported by a plate 25 by means of suction cups 27, which are under negative pressure since they are connected to a suction pump by means of conduits 28 (only one suction cup with a conduit is shown in the drawing).

The plate 25 is supported by an yoke 29, which in turn is supported by a power device 30 such as a hydraulic cylinder (only partly shown). By means of this device, the slab 23 may be kept in a raised position above the slab 22 so that a space is formed between the opposing surfaces. By means of the power device 20, the slab 23 may be lowered and pressed against the slab 22 with said surfaces pressed against each other.

Rails 32 travel along both sides of the table 24 (only the ends are shown). A wagon 33 may run on these rails. It is exposed on both sides to directed rays 34 for heat radiation, infrared light. A feedable cable (not shown) for current supply to the rays is arranged. A second wagon 36 is also arranged to run on the rails. It supports a number of powder spray nozzles 37 which are arranged so that the complete surface of the lower slab 22 may be coated with powder. It is also conceivable that the upper surface be coated with powder by means of spray nozzles which are directed upwards. As mentioned earlier, it is advantageous if the powder is electrostatically charged and thereby receives a uniform distribution before it reaches the surface. It has also been mentioned that if the surfaces may obtain another potential than the powder, they will attract the same, so that the distribution outside the surfaces which are to be coated is limited.

Furthermore, the device is provided with radiators for ultraviolet light, which are marked with circles 39. The intention is that the UV-light shall reach the surfaces which are coated with powder. Since the space between the surfaces of the slabs may be relatively narrow, a good light distribution must be provided. This may be achieved by means of a plurality of radiators around the slabs or, alternatively, the radiators may also be located on a wagon which may be moved on the rails 32.

Gluing in the described device takes place such that after the slabs 22 and 23 have been supplied and the slab 23 has been lifted by negative pressure inside the suction cups 27, the wagon 33 with the heat radiators 34 is passed through the space between the opposing surfaces of the slabs. The intensity of the heat rays and the speed of the wagon are so adapted that at least the surface layer of the slabs receives heating to the earlier mentioned temperature level. The heating may be supported by means of blowing in heated air; the device for this is, however, not shown. On the whole, the heating is adapted to the nature of the objects which are to be agglutinated, and to the extension of their surfaces etc. In certain cases, solely heating or heat radiation is to be preferred. In other cases, convection heating by means of heated air is to be preferred, and in many cases a combination is probably the most convenient.

When the surfaces have obtained a sufficient heating, the wagon 36 is brought into the space between the slabs and at least one surface is coated with powder. This will then melt and thus adhere to the coated surface. Therefore, it is also possible to coat the surface facing downwards, without the powder falling off, even if retention by means of electrostatic forces would not be utilized.

The surfaces are now coated with the thermosetting plastic glue which has adopted a melted and tacky state. While this state still is maintained, the glue-coated surfaces are subjected to the ultraviolet radiation by means of the radiators 39 or, as earlier mentioned, radiators on an additional wagon. This must be done very quickly so that the gluing surfaces may be joined by means of activation of the power device 30 with the plate 25 being lowered and compressing the two slabs. After initiation by the radiation, the curing namely starts rapidly and therefore a rapid sequence of the irradiation and the compression is required.

The embodiment described in connection with FIG. 2 only constitutes an example. It must be adapted to different types of objects and surfaces which are to be agglutinated. Important are, however, the main elements of heating, coating with powder and melting of the same, and irradiation in order to initiate the curing and immediately thereafter pressing the surfaces together.

The described device only shows an example of how the method in its second embodiment may be carried out with the use of UV-curing powder. The method in this form may for instance also be applied to a gluing corresponding to the first embodiment shown in FIG. 2. If the ingoing lamination materials are not suitable to heat to the temperature for thermo-setting, one or both layers may be heated to the lower temperature. The powder is applied to at least one of the layers before the layers meet, so that curing starts at a distance from the nip near by the roller. Within this distance the curing is initiated by emitting a focused band of UV-radiation or other applicable electromagnetic radiation.

What is claimed is:

1. A method for gluing first and second surface together comprising preparing a glue comprising a polymer in the form of a powder, said glue having a melting temperature of up to about 100° C. and being curable by electromagnetic radiation applying said powder in a dry state to at least one of said first and second surfaces, heating a region proximate to said at least one of said first and second surfaces whereby said powder melts but does not cure, subjecting said at least one of said first and second surfaces to electromagnetic radiation in order to initiate curing of said powder, and joining said first and second surfaces together prior to completion of said curing of said powder whereby said first and second surfaces adhere to each other by means of the tackiness of said glue and are maintained together by said subsequently cured glue.

2. The method of claim 1 wherein said glue has a melting temperature of between 60 and 100° C.

3. The method of claim 1 wherein said electromagnetic radiation comprises ultraviolet radiation.

4. The method of claim 1 including heating said at least one of said first and second surfaces by heat radiation or convection by heated air prior to said applying of said powder.

5. A method for gluing first and second surfaces together wherein said first surface comprises a flexible surface comprising preparing a glue comprising a thermosetting polymer in the form of a powder, bending said first surface in a manner with respect to said second surface whereby said first and second surfaces are successively pressed against each other to form a nip therebetween, applying said polymer in a dry state to at least one of said first and second surfaces at said nip between said first and second surfaces and on said at least one of said first and second surfaces displaced from said nip where said first and second surfaces are separated from each other, heating said glue to a tacky state whereby said glue adheres to said at least one of said first and second surfaces, and curing said glue by applying electromagnetic radiation to said at least one of said first and second surfaces when said surfaces are pressed together.

6. The method of claim 5 wherein said applying of said polymer in said dry state comprises applying said powder in an electrostatically charged state, and including maintaining a potential or polarity difference in said at least one of said first and second surfaces whereby said powder is retained by means of electrostatic forces until said powder melts to thereby obtain adhesion therewith.

7. A composition of matter for use in the method of claim 12 comprising a glue having a melting temperature of up to about 100° C. and being curable by means of electromagnetic radiation and including an adhesion promoter comprising methylvinylether-maleic anhydride.

8. The composition of matter of claim 7 wherein said melting temperature is between about 60 and 100° C.

9. The composition of matter of claim 7 wherein said electromagnetic radiation comprises ultraviolet radiation.

10. The composition of matter of claim 7 wherein said glue comprises at least one polymer, a photoinitiating system whereby said polymer can be cured by means of ultraviolet radiation, and a leveling agent to provide said glue with said melting temperature.

11. The composition of matter of claim 10 wherein said at least one polymer comprises unsaturated polyester in an amount of between about 70% to close to 100% of said at least one polymer and including a hardener, and wherein said photoinitiator is present in an amount of between about 1% and 3% and said leveling agent is present in an amount of between about 1% and 3%.

12. Apparatus for gluing first and second surfaces together with a glue comprising a polymer in the form of a powder comprising holding means for maintaining said first and second surfaces separated by a predetermined gap from each other and for pressing said first and second surfaces against each other, heating means for heating at least one of said first and second surfaces, powder application means for applying said powder in a dry state to said at least one of said first and second surfaces radiation means for subjecting said at least one of said first and second surfaces to electromagnetic radiation in order to initiate curing of said powder, and activation means for activating said holding means to press said first and second surfaces against each other whereby said first and second surfaces adhere to each other by means of the tackiness of said glue and are maintained together by said subsequently cured glue.

13. The apparatus of claim 12 wherein said heating means comprises means for heating said at least one of said first and second surfaces by means of heat radiation or convection.

14. The apparatus of claim 12 wherein said electromagnetic radiation comprises ultraviolet radiation.

15. The apparatus of claim 12 wherein said heating means comprises mobile heating means whereby said mobile heating means can be moved within said predetermined gap, and wherein said powder application means comprises mobile powder application means whereby said mobile powder application means can be moved within said predetermined gap.

* * * * *

UNITED STATES PATENT AND TRADEMARK OFFICE
CERTIFICATE OF CORRECTION

PATENT NO. : 6,099,679
DATED : August 8, 2000
INVENTOR(S) : Kärem et al.

It is certified that error appears in the above-identified patent and that said Letters Patent is hereby corrected as shown below:

Col. 6, line 51, "electromagnetic" should read --electro-magnetic--.

Col. 6, line 52, "electromagnetic" should read --electro-magnetic--.

Col. 7, line 4, "electromagnetic" should read --electro-magnetic--.

Col. 7, line 17, "th e" should read --the--.

Col. 9, line 39, "surface" should read --surfaces--.

Col. 10, line 19, "12" should read --1--.

Col. 10, line 24, delete "about".

Col. 10, line 47, after "surfaces" insert --,--.

Signed and Sealed this

Seventeenth Day of April, 2001

Attest:

NICHOLAS P. GODICI

*Attesting Officer*   *Acting Director of the United States Patent and Trademark Office*